(12) United States Patent
Hall (10) Patent No.: US 11,656,797 B2
(45) Date of Patent: May 23, 2023

(54) DATA STORAGE DEVICE EXECUTING RUNT WRITE COMMANDS AS FREE COMMANDS

(71) Applicant: Western Digital Technologies, Inc., San Jose, CA (US)

(72) Inventor: David R. Hall, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 1 day.

(21) Appl. No.: 17/387,638

(22) Filed: Jul. 28, 2021

(65) Prior Publication Data
US 2023/0033399 A1 Feb. 2, 2023

(51) Int. Cl.
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0679* (2013.01)

(58) Field of Classification Search
CPC .... G06F 3/0659; G06F 3/0611; G06F 3/0656; G06F 3/0679
See application file for complete search history.

(56) References Cited

U.S. PATENT DOCUMENTS

| | | | | |
|---|---|---|---|---|
| 5,146,594 A * | 9/1992 | Iitsuka | ............ | G06F 8/433 717/150 |
| 5,442,752 A * | 8/1995 | Styczinski | ......... | G11B 20/1833 714/E11.034 |
| 6,112,265 A * | 8/2000 | Harriman | ............ | G06F 3/0674 710/39 |
| 6,578,107 B1 * | 6/2003 | Anderson | ........... | G06F 12/0862 711/113 |
| 6,711,628 B1 * | 3/2004 | Thelin | ............ | G06F 3/0659 710/39 |
| 6,845,405 B1 * | 1/2005 | Thelin | ............ | G06F 3/0611 710/39 |
| 6,854,022 B1 | 2/2005 | Thelin | | |
| 8,797,669 B1 * | 8/2014 | Burton | ........... | G11B 5/02 360/39 |
| 8,832,366 B1 * | 9/2014 | Huynh | ........... | G06F 12/0804 711/171 |
| 8,885,283 B1 | 11/2014 | Chahwan et al. | | |
| 9,269,393 B1 * | 2/2016 | Webb | ........... | G11B 27/36 |
| 9,274,966 B1 | 3/2016 | Chahwan et al. | | |

(Continued)

OTHER PUBLICATIONS

Dimitrijevic, Systems Support for Preemptive Disk Scheduling, Oct. 2005 (Year: 2005).*

*Primary Examiner* — Ramon A. Mercado
(74) *Attorney, Agent, or Firm* — Patterson + Sheridan, LLP; Steven H. VerSteeg (57) ABSTRACT

A data storage device is disclosed comprising a head actuated over a disk comprising a plurality of data tracks. A plurality of access commands including a plurality of write commands are stored in a command queue, and the access commands are sorted into an execution order. A first write command is selected from the command queue based on the execution order, and a first part of the first write command is executed leaving a runt write command. The runt write command is executed between two of the sorted access commands so that the runt write command does not affect the execution order.

20 Claims, 6 Drawing Sheets

(56) References Cited

U.S. PATENT DOCUMENTS

| | | | |
|---|---|---|---|
| 9,842,622 B1* | 12/2017 | Monroe | G11B 20/1889 |
| 9,870,281 B1* | 1/2018 | Gosla | G11B 20/10527 |
| 10,379,760 B1 | 8/2019 | Hall | |
| 10,522,185 B1* | 12/2019 | Hall | G11B 21/025 |
| 10,564,890 B2* | 2/2020 | Lovell | G06F 3/0679 |
| 10,635,330 B1* | 4/2020 | Koli | G06F 3/067 |
| 11,010,099 B1 | 5/2021 | Hall | |
| 2002/0188812 A1* | 12/2002 | Sadhasivan | G11C 16/06 711/153 |
| 2003/0056034 A1* | 3/2003 | Olds | G11B 19/02 710/5 |
| 2003/0061459 A1* | 3/2003 | Aboulenein | G06F 13/161 711/E12.004 |
| 2004/0264022 A1* | 12/2004 | Kimura | G11B 20/1883 |
| 2007/0050592 A1* | 3/2007 | Gschwind | G06F 9/3816 712/E9.046 |
| 2008/0120450 A1* | 5/2008 | Mott | G06F 13/364 710/113 |
| 2010/0077175 A1* | 3/2010 | Wu | G06F 3/0659 711/E12.001 |
| 2013/0242425 A1* | 9/2013 | Zayas | G11B 20/10 |
| 2013/0275650 A1* | 10/2013 | Hida | G06F 12/0246 711/102 |
| 2015/0121021 A1* | 4/2015 | Nakamura | G06F 3/0659 711/159 |
| 2015/0378621 A1* | 12/2015 | Bruner | G06F 12/0833 711/114 |
| 2017/0300269 A1* | 10/2017 | Um | G06F 3/0659 |
| 2018/0074728 A1* | 3/2018 | Chahwan | G06F 3/068 |
| 2018/0246658 A1* | 8/2018 | Bretschneider | G06F 3/065 |
| 2018/0275870 A1* | 9/2018 | Goldberg | G06F 3/0644 |
| 2018/0341565 A1* | 11/2018 | Nair | G11B 20/1889 |
| 2018/0349037 A1* | 12/2018 | Zhao | G06F 3/0611 |
| 2019/0051324 A1* | 2/2019 | Zhao | G06F 3/0616 |
| 2019/0114255 A1* | 4/2019 | Jain | G06F 3/068 |
| 2019/0163620 A1* | 5/2019 | Muthiah | G06F 9/3013 |
| 2019/0377633 A1* | 12/2019 | Perlmutter | G06F 11/1012 |
| 2020/0159461 A1* | 5/2020 | Liang | G06F 3/0659 |
| 2022/0100418 A1* | 3/2022 | Benisty | G06F 12/0886 |

* cited by examiner

DATA STORAGE DEVICE EXECUTING RUNT WRITE COMMANDS AS FREE COMMANDS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
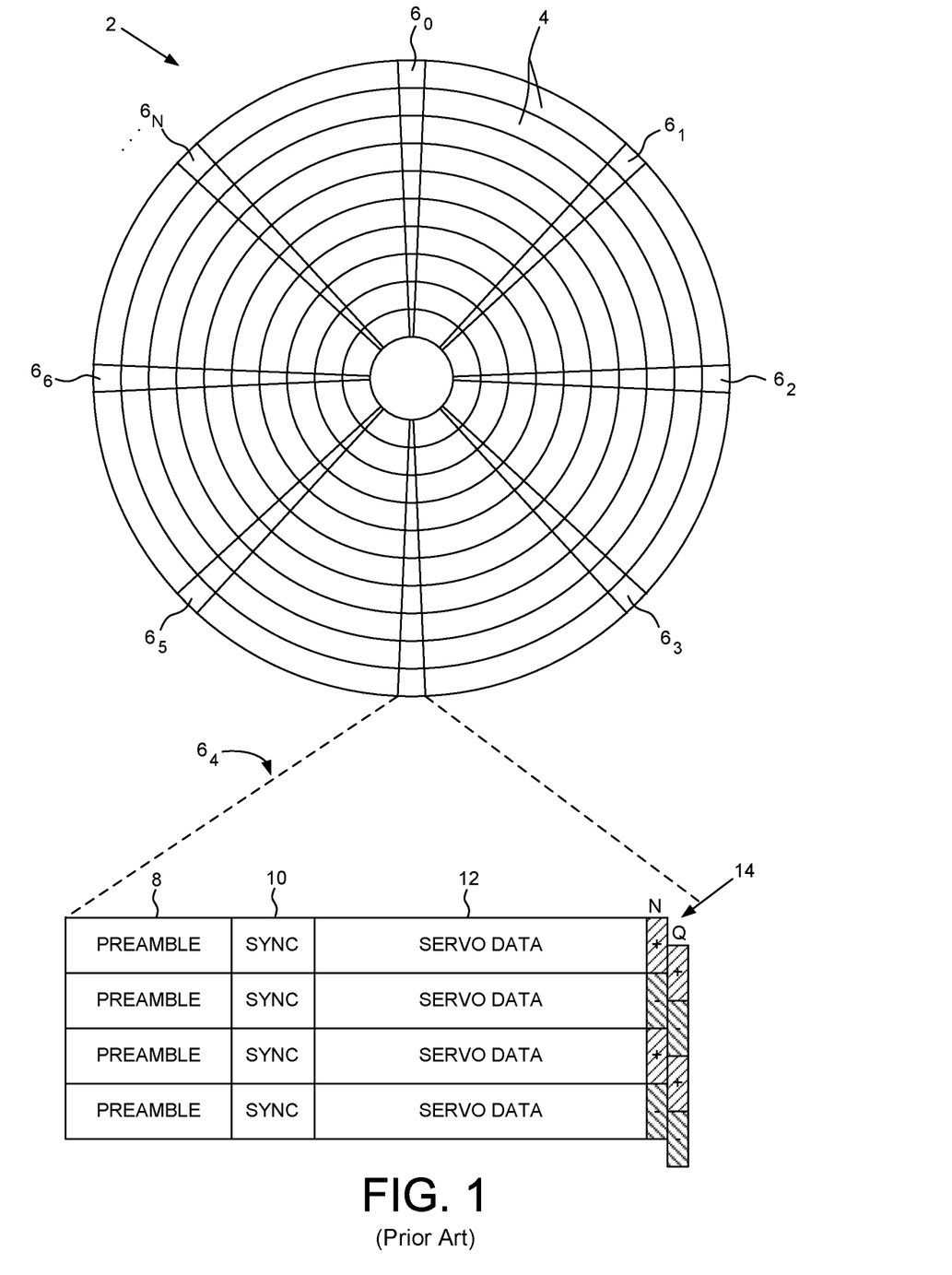
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by concentric servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
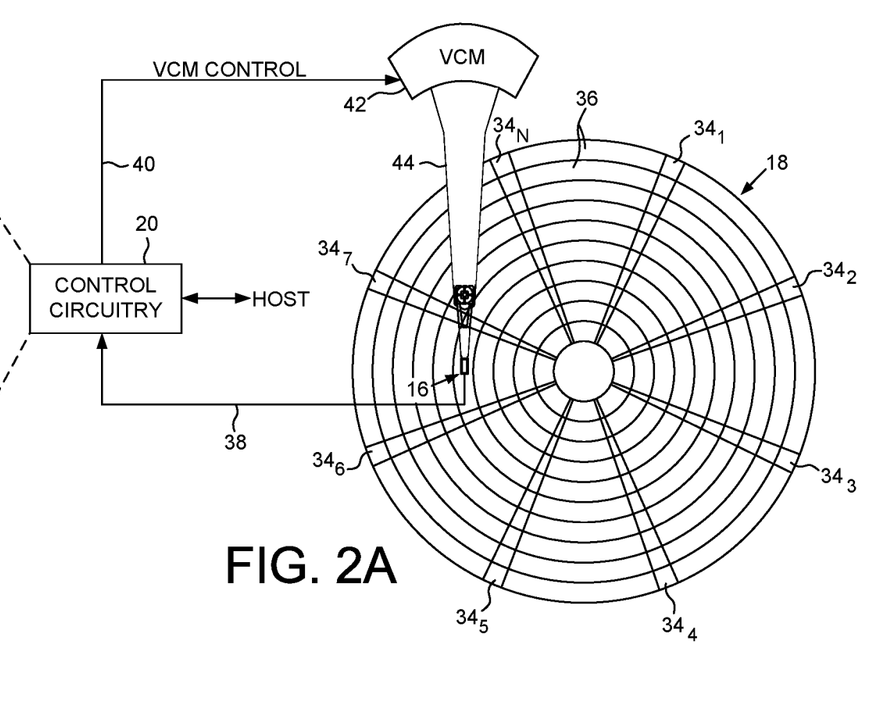
FIG. 2A shows a data storage device in the form of a disk drive according to an embodiment comprising a head actuated over a disk comprising a plurality of data tracks.
Figure 2B:
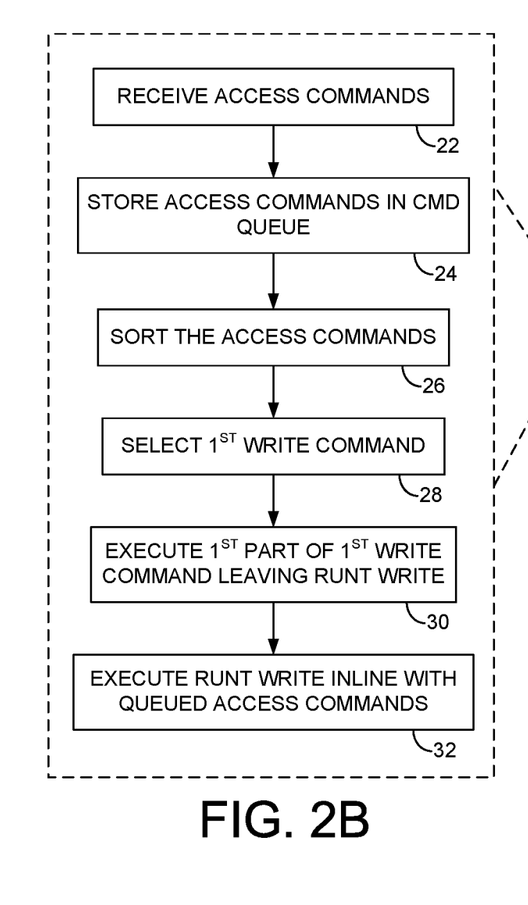
FIG. 2B is a flow diagram according to an embodiment wherein part of a write command is executed leaving a runt write command which is executed inline with other queued access commands.

FIG. 2A shows a data storage device in the form of a disk drive according to an embodiment comprising a head 16 actuated over a disk 18 comprising a plurality of data tracks, and control circuitry 20 configured to execute the flow diagram of FIG. 2B. A plurality of access commands are received (block 22), including a plurality of write commands. The access commands are stored in a command queue (block 24), and the access commands are sorted into an execution order (block 26). A first write command is selected from the command queue based on the execution order (block 28), and a first part of the first write command is executed leaving a runt write command (block 30). The runt write command is executed between two of the sorted access commands so that the runt write command does not affect the execution order (block 32).

In the embodiment of FIG. 2A, the disk 18 comprises a plurality of servo sectors $34_1$-$34_N$ that define a plurality of servo tracks 36, wherein the data tracks are defined relative to the servo tracks at the same or different radial density. The control circuitry 20 processes a read signal 38 emanating from the head to demodulate the servo sectors and generate a position error signal (PES) representing an error between the actual position of the head and a target position relative to a target track. A servo control system in the control circuitry 20 filters the PES using a suitable compensation filter to generate a control signal 40 applied to a coarse actuator (e.g., VCM 42) which rotates an actuator arm 44 about a pivot in order to actuate the head radially over the disk in a direction that reduces the PES. The head may also be servoed using a fine actuator, such as a piezoelectric (PZT) actuator, configured to actuate a suspension relative to the actuator arm 44, and/or configured to actuate the head relative to the suspension. The servo sectors $34_1$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3A:
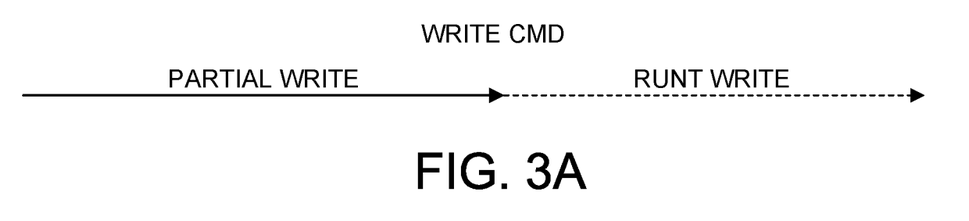
FIG. 3A shows an embodiment wherein a runt write command is generated due to a write command being aborted (e.g., due to a vibration).

In one embodiment, when a write command is selected for execution based on the execution order generated by the sort algorithm, only part of the write command may be executed leaving a runt write command. FIG. 3A shows an embodiment wherein a runt write command may be generated due to aborting a write command (e.g., due to a vibration). FIG.

Figure 3B:
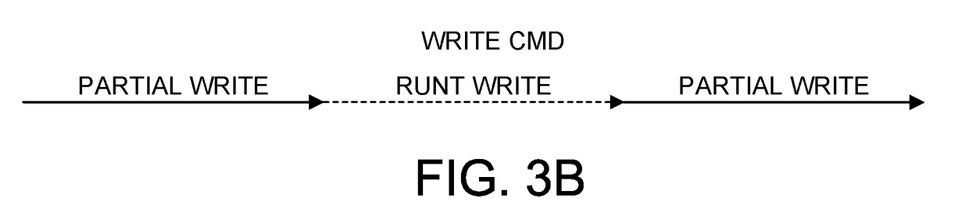
FIG. 3B shows an embodiment wherein a runt write command is generated when a write command is suspended (e.g., due to a vibration).
Figure 3C:
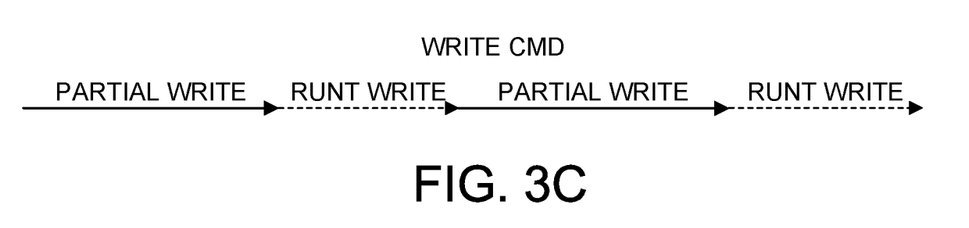
FIG. 3C shows an embodiment wherein multiple runt write commands are generated when a write command is suspended multiple times.
Figure 3D:
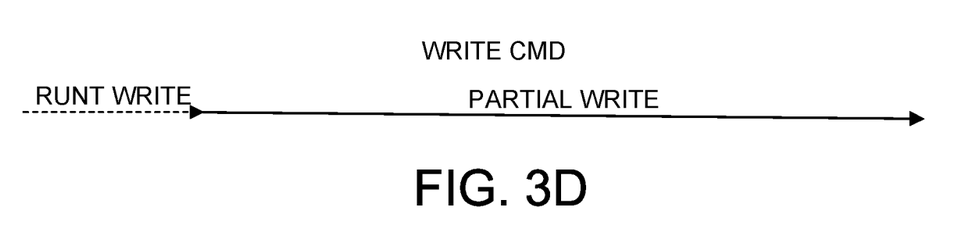
FIG. 3D shows an embodiment wherein a runt write command is generated at the beginning of a write command due to a delay in the head settling onto the target data track.

3B shows an embodiment wherein a runt write command may be generated due to suspending a write command (e.g., due to a vibration), and FIG. 3C shows an embodiment wherein multiple runt write commands may be generated due to suspending a write command multiple times. FIG. 3D shows an embodiment wherein a runt write command is generated at the beginning of a write command due to a delay in the head settling onto the target data track. Regardless as to how a runt write command is generated, in one embodiment the runt write command is executed inline with the queued access commands without sorting the runt write command into the execution order. That is, the access commands stored in the command queue are sorted into an execution order independent of the runt write command(s), and then the runt write command(s) are executed opportunistically while executing the queues access commands based on the sorted execution order. In effect, the runt write commands are executed as "free commands" when a runt write command may be executed without affecting the execution order and corresponding metrics of the sort algorithm (e.g., minimizing latency, minimizing power, etc.).

Figure 4A:
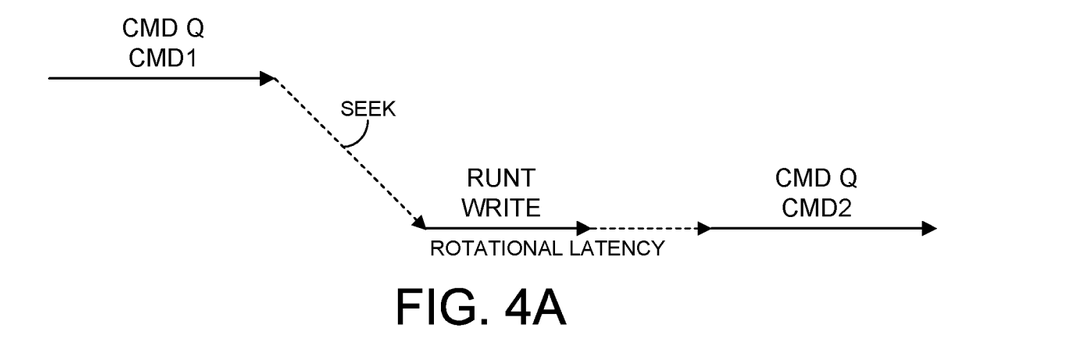
FIG. 4A shows an embodiment wherein a runt write command is executed during the rotational latency prior to executing a queued access command.
Figure 4B:
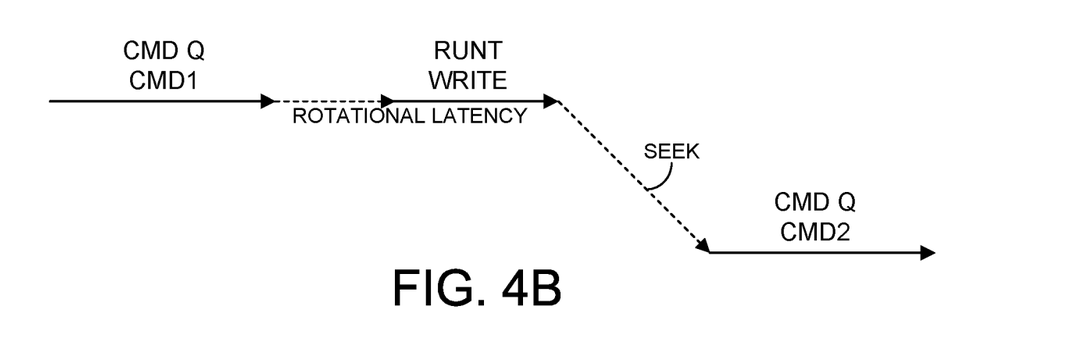
FIG. 4B shows an embodiment wherein a runt write command is executed during the rotational latency after executing a queued access command.
Figure 4C:
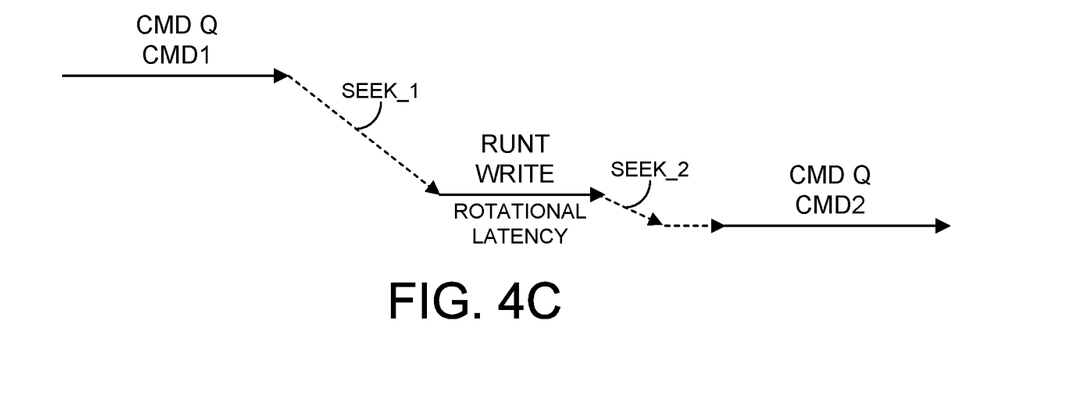
FIG. 4C shows an embodiment wherein a runt write command is executed when seeking to a queued access command.

FIG. 4A shows an example embodiment of how a runt write command may be executed opportunistically as a free command. In this example, the sort algorithm sorts the queued access commands such that CMD2 is executed after CMD1 (independent of the runt write commands). After executing CMD1, the control circuitry 20 seeks the head to the data track corresponding to CMD2, and during the rotational latency while waiting for the head to reach the start of CMD2, a runt write command is opportunistically executed as a free command. FIG. 4B shows another example embodiment of how a runt write command may be executed opportunistically as a free command. In this example, the sort algorithm again sorts the queued access commands such that CMD2 is executed after CMD1 (independent of the runt write commands). After executing CMD1 but before executing the seek, during the rotational latency the control circuitry 20 executes a runt write command opportunistically as a free command, and then seeks the head to the data track corresponding to CMD2. FIG. 4C shows yet another example embodiment of how a runt write command may be executed opportunistically as a free command. In this example, the sort algorithm again sorts the queued access commands such that CMD2 is executed after CMD1 (independent of the runt write commands). After executing CMD1, the control circuitry 20 seeks the head to an intermediate data track in order to opportunistically execute a runt write command as a free command, and then continues seeking the head to the data track corresponding to CMD2.

In the examples described above, although the sort algorithm generates the execution order independent of the runt write commands, the actual execution of the access commands may be carried out so as to accommodate the execution of runt write commands as free commands. For example, the control circuitry 20 may execute a seek immediately after executing the current access command in order to accommodate a runt write command such as shown in FIG. 4A, or the control circuitry 20 may delay executing a seek after executing the current access command in order to accommodate a runt write command such as shown in FIG. 4B. That is in one embodiment after sorting the queued access commands into the execution order, the control circuitry 20 evaluates the runt write commands to determine whether one or more may be executed between the consecutive execution of first and second queued access commands.

Figure 5:
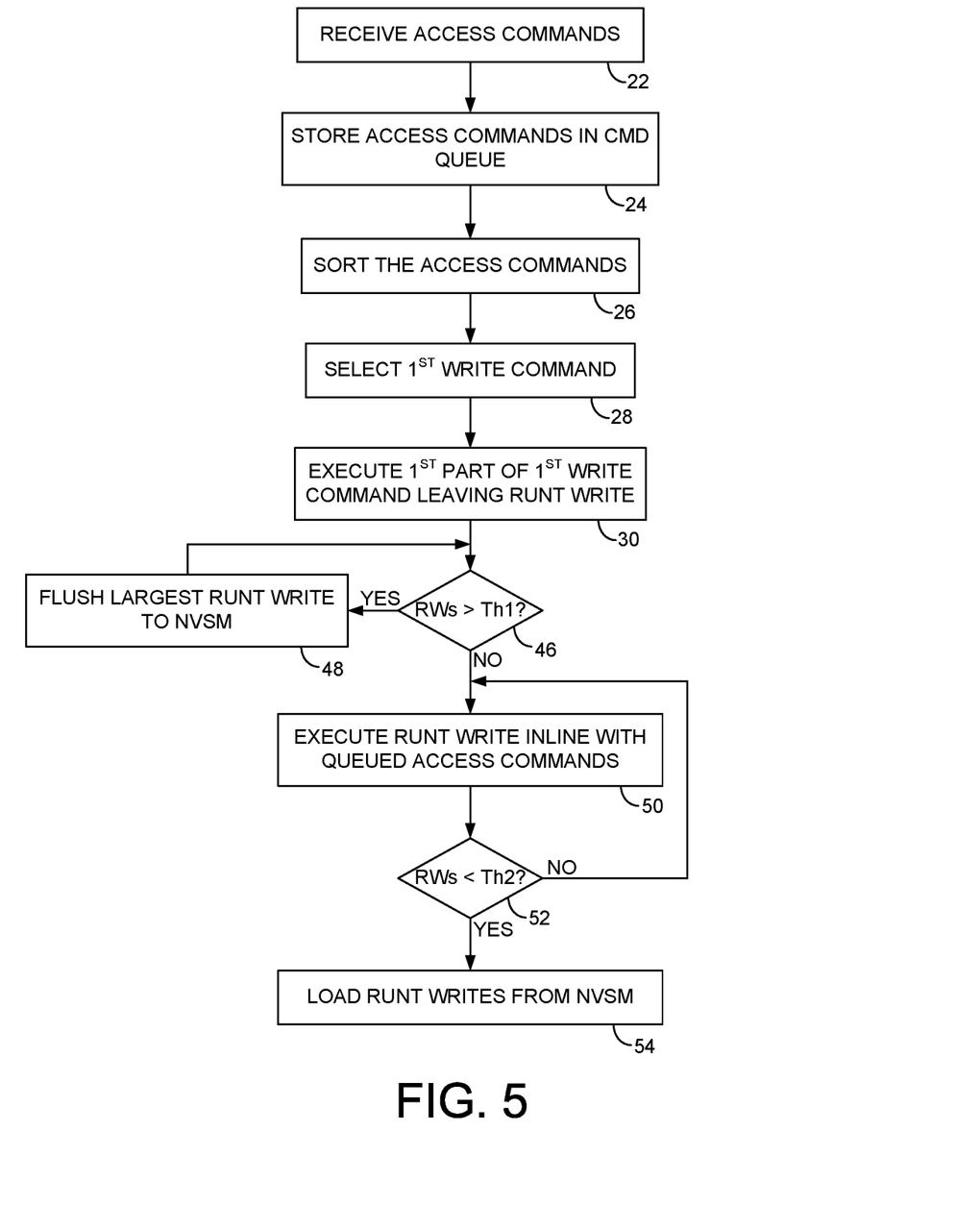
FIG. 5 is a flow diagram according to an embodiment wherein when the buffered runt write commands exceed a threshold, the largest runt write command is flushed to a non-volatile semiconductor memory (NVSM).

In one embodiment, multiple runt write commands may be pending (e.g., buffered in a volatile semiconductor memory (VSM)) wherein the control circuitry 20 may select from this pool of runt write commands for execution as free commands inline with the queued access commands. In one embodiment, the amount of memory in the VSM allocated to buffering runt write commands may be limited, and when nearing the limit, the control circuitry 20 may flush one or more of the pending runt write commands to a non-volatile semiconductor memory (NVSM), such as to a Flash memory. In one embodiment, the control circuitry 20 may select which runt write command(s) to flush to the NVSM based on any suitable criteria. For example, in one embodiment the control circuitry 20 may flush the largest pending runt write command to the NVSM since large runt write commands are less likely to be selected for execution as a free command. In addition, flushing large runt write commands to the NVSM frees up space in the VSM to store more smaller runt write commands which may increase the likelihood of executing a runt write command as a free command. The flow diagram of FIG. 5 is an example of this embodiment which extends on the flow diagram of FIG. 2B, wherein when the pending runt write commands exceeds a first threshold (block 46), the largest runt write command is flushed to the NVSM (block 48). This process may be repeated until the pending runt write commands fall below the first threshold at block 46 (or a lower hysteresis threshold). Pending runt write commands are then executed as free commands inline with the queued access commands (block 52), and when the pending runt writes falls below a second threshold (block 52), one or more runt writes are loaded from the NVSM into the VSM (block 54) which then become pending runt write commands eventually executed as free commands. In one embodiment, one or more runt write commands stored in the NVSM may be migrated to the disk when the data storage device enters an idle mode (not executing queued access commands).

In one embodiment, a runt write command may be split into multiple pending runt write commands in order to facilitate execution of a runt write command as a free command. For example, in one embodiment the control circuitry 20 may split a runt write command into a first and second runt write command when one of the first or second runt write commands could be executed inline with the queued access commands as described above.

Figure 6:
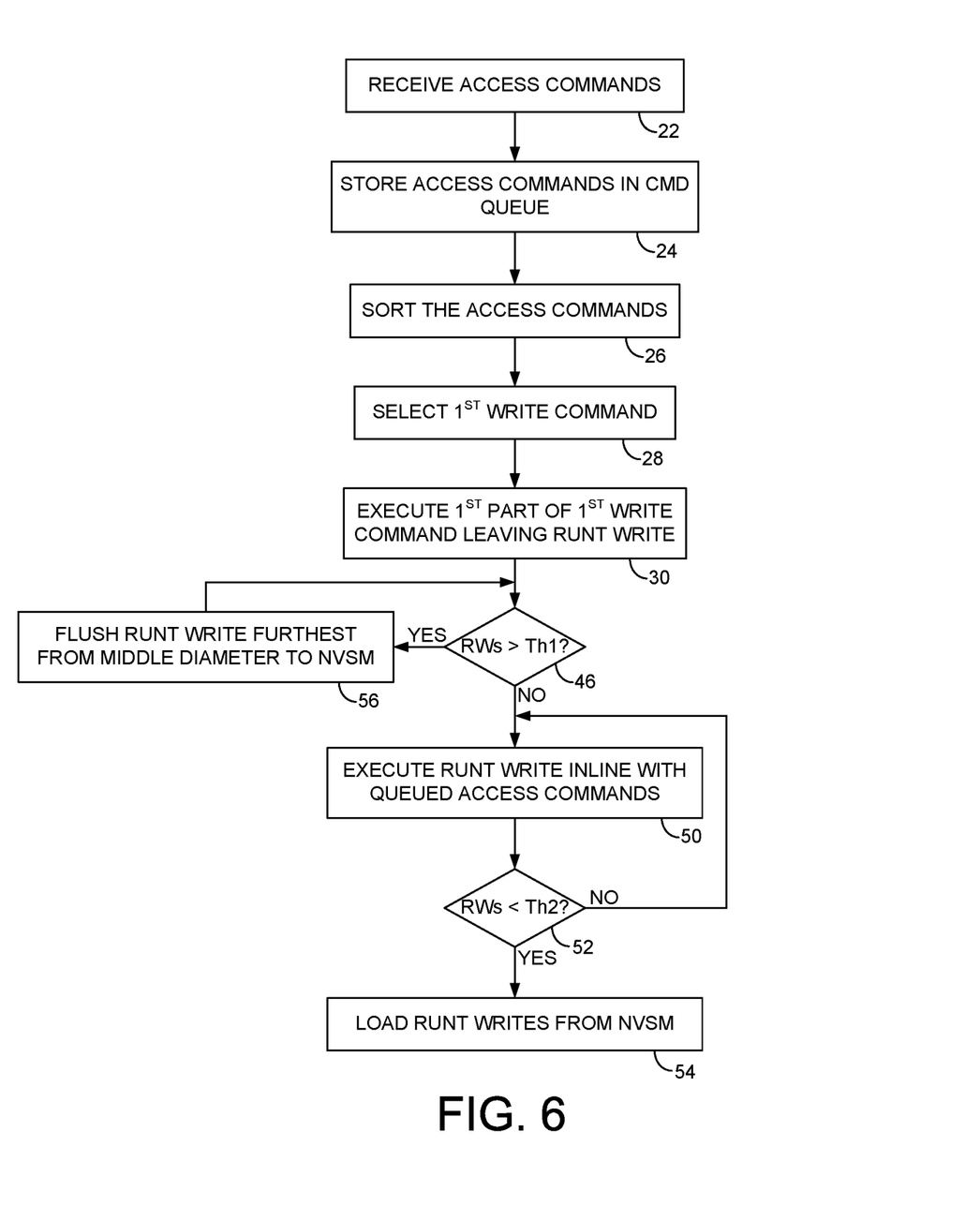
FIG. 6 is a flow diagram according to an embodiment wherein when the buffered runt write commands exceed a threshold, the runt write command farthest from the middle diameter of the disk is flushed to a NVSM.

FIG. 6 is a flow diagram according to an embodiment wherein when the pending runt write commands exceed the first threshold (block 46), the runt write command farthest from a middle diameter of the disk is flushed to the NVSM (block 56). In this embodiment, the pending runt write commands farthest from the middle diameter of the disk may be the least likely to be selected for execution as a free command due to the seeking propensity of the head. Accordingly, these pending runt write commands may be flushed to the NVSM and then loaded back into the VSM as pending runt write commands when the available buffer memory increases (i.e., as other pending runt write commands are executed at block 50). Alternatively, the runt write commands stored in the NVSM may be migrated to the disk, for example, during an idle mode.

In one embodiment, generating and executing runt write commands as free commands enables certain parameters of the disk drive to be adjusted in order to improve performance. For example, in one embodiment more aggressive seek profiles may be used to seek the head faster between the data tracks, thereby reducing the seek times. In this embodiment, if the head is unable to settle onto the target data track at the end of the seek when executing a write command, the first part of the write command may be split into a runt write command as described above with reference to FIG. 3D. Since the runt write commands are executed as free commands, the overall throughput performance is increased due to the decreased seek latency. In another embodiment, the threshold that triggers a write abort (or write suspend) may be decreased to help reduce adjacent track interference when the head deviates from the target data track during a write operation, wherein reducing adjacent track interference reduces the frequency of refresh operations.

In one embodiment, the write commands received from the host are executed with write cache enabled, meaning the host may be notified immediately that the write command has been executed even though the write command is still pending in the command queue (and the write data cached in the VSM). In one embodiment, the disk drive implements suitable fail safe procedures to protect against a power failure, such as having the ability to flush the cached write data to the NVSM or the disk during a power failure event. In this manner, the throughput performance as seen from the host is unaffected when only part of a write command is executed leaving one or more runt write commands. That is, deferring the actual completion of a write command until all parts of the write command have been executed (including all runt write commands) does not impact the throughput performance as seen from the host.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of data tracks;
a head actuated over the disk; and
control circuitry configured to:
   receive a plurality of access commands including a plurality of write commands;
   store the access commands in a command queue;
   sort the access commands into an execution order;
   select a first write command from the command queue based on the execution order;
   execute a first part of the first write command leaving a runt write command upon an abortion of execution of the first write command; and
   execute the runt write command between two of the sorted access commands so that the runt write command does not affect the execution order.

2. The data storage device as recited in claim 1, wherein the control circuitry is further configured to sort the access commands into the execution order independent of the runt write command.

3. The data storage device as recited in claim 1, wherein after executing the first part of the first write command the control circuitry is further configured to:
   seek the head to a second data track corresponding to a second access command in the sorted execution order;
   execute the second access command;
   after executing the second access command, seek the head to a first data track corresponding to the runt write command not in the sorted execution order;
   after executing the runt write command, seek the head to a third data track corresponding to a third access command in the sorted execution order.

4. The data storage device as recited in claim 1, wherein after executing the first part of the first write command the control circuitry is further configured to:

seek the head to a second data track corresponding to a second access command in the sorted execution order;

prior to executing the second access command, execute at least part of the runt write command by writing data to the second data track;

after executing the at least part of the runt write command, execute the second access command.

5. The data storage device as recited in claim 1, wherein after executing the first part of the first write command the control circuitry is further configured to:

seek the head to a second data track corresponding to a second access command in the sorted execution order;

execute the second access command;

after executing the second access command, execute at least part of the runt write command by writing data to the second data track.

6. The data storage device as recited in claim 1, further comprising a non-volatile semiconductor memory (NVSM), wherein the control circuitry is further configured to:

buffer a plurality of runt write commands; and flush at least one of the runt write commands to the NVSM.

7. The data storage device as recited in claim 6, wherein the control circuitry is further configured to select the runt write command to flush based on the size of each of the buffered runt write commands.

8. The data storage device as recited in claim 7, wherein the control circuitry is further configured to select the largest runt write command to flush to the NVSM.

9. The data storage device as recited in claim 6, wherein the control circuitry is further configured to select the runt write command to flush based on a target radial location on the disk corresponding to each of the buffered runt write commands.

10. The data storage device as recited in claim 9, wherein the control circuitry is further configured to select the runt write command having a target radial location that is farthest from a middle of the disk.

11. A data storage device comprising:

a disk comprising a plurality of data tracks;

a head actuated over the disk; and control circuitry configured to:

receive a plurality of access commands including a plurality of write commands;

store the access commands in a command queue;

sort the access commands into an execution order;

select a first write command from the command queue based on the execution order;

execute a first part of the first write command leaving a runt write command upon an abortion of execution of the first write command; and execute the runt write command inline with the queued access commands without sorting the runt write command into the execution order.

12. The data storage device as recited in claim 11, wherein the control circuitry is further configured to execute the runt write command between two of the sorted access commands so that the runt write command does not affect the execution order.

13. The data storage device as recited in claim 11, wherein after executing the first part of the first write command the control circuitry is further configured to:

seek the head to a second data track corresponding to a second access command in the sorted execution order;

execute the second access command;

after executing the second access command, seek the head to a first data track corresponding to the runt write command not in the sorted execution order;

after executing the runt write command, seek the head to a third data track corresponding to a third access command in the sorted execution order.

14. The data storage device as recited in claim 11, wherein after executing the first part of the first write command the control circuitry is further configured to:

seek the head to a second data track corresponding to a second access command in the sorted execution order;

prior to executing the second access command, execute at least part of the runt write command by writing data to the second data track;

after executing the at least part of the runt write command, execute the second access command.

15. The data storage device as recited in claim 11, wherein after executing the first part of the first write command the control circuitry is further configured to:

seek the head to a second data track corresponding to a second access command in the sorted execution order;

execute the second access command;

after executing the second access command, execute at least part of the runt write command by writing data to the second data track.

16. The data storage device as recited in claim 11, further comprising a non-volatile semiconductor memory (NVSM), wherein the control circuitry is further configured to:

buffer a plurality of runt write commands; and flush at least one of the runt write commands to the NVSM.

17. The data storage device as recited in claim 16, wherein the control circuitry is further configured to select the runt write command to flush based on the size of each of the buffered runt write commands.

18. The data storage device as recited in claim 17, wherein the control circuitry is further configured to select the largest runt write command to flush to the NVSM.

19. The data storage device as recited in claim 16, wherein the control circuitry is further configured to select the runt write command to flush based on a target radial location on the disk corresponding to each of the buffered runt write commands.

20. The data storage device as recited in claim 19, wherein the control circuitry is further configured to select the runt write command having a target radial location that is farthest from a middle of the disk.

* * * * *